United States Patent
Shuf et al.

(10) Patent No.: US 6,892,212 B2
(45) Date of Patent: May 10, 2005

(54) METHOD FOR EFFICIENT GARBAGE COLLECTION BASED ON OBJECT TYPE

(75) Inventors: Yefim Shuf, Forest Hills, NY (US); Manish Gupta, Yorktown Heights, NY (US); Rajesh Bordawekar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/093,656

(22) Filed: Mar. 7, 2002

(65) Prior Publication Data

US 2002/0138506 A1 Sep. 26, 2002

Related U.S. Application Data

(60) Provisional application No. 60/278,060, filed on Mar. 22, 2001, and provisional application No. 60/281,759, filed on Apr. 5, 2001.

(51) Int. Cl.[7] ............................................... B06F 17/30
(52) U.S. Cl. ......................................... 707/206; 707/10
(58) Field of Search ..................... 707/206, 1, 103 R; 714/9; 717/126, 148, 153, 162; 718/1, 107; 719/315; 710/260; 709/1; 702/186

(56) References Cited

U.S. PATENT DOCUMENTS

| | | | |
|---|---|---|---|
| 5,920,876 A | 7/1999 | Ungar et al. | 707/206 |
| 5,930,807 A | 7/1999 | Ebrahim et al. | 707/206 |
| 5,933,840 A | 8/1999 | Menon et al. | 707/206 |
| 5,953,736 A | 9/1999 | O'Connor et al. | 711/6 |
| 6,047,295 A | 4/2000 | Endicott et al. | 707/206 |
| 6,049,810 A | 4/2000 | Schwartz et al. | 707/206 |
| 6,070,173 A | 5/2000 | Huber et al. | 707/206 |
| 6,101,580 A | 8/2000 | Agesen et al. | 711/132 |
| 6,115,782 A | 9/2000 | Wolczko et al. | 711/100 |
| 6,131,191 A | 10/2000 | Cierniak et al. | 717/48 |
| 6,138,127 A | 10/2000 | Pasch | 707/206 |
| 6,148,310 A | 11/2000 | Azagury et al. | 707/206 |
| 6,185,581 B1 | 2/2001 | Garthwaite | 707/206 |
| 6,226,761 B1 | 5/2001 | Berstis | 714/37 |
| 6,249,793 B1 | 6/2001 | Printezis et al. | |
| 6,438,560 B1 * | 8/2002 | Loen | 707/103 R |
| 6,502,109 B1 * | 12/2002 | Aravamudan et al. | 707/206 |
| 2001/0000821 A1 | 5/2001 | Kolodner et al. | 707/206 |
| 2002/0042807 A1 * | 4/2002 | Thomas et al. | 709/1 |
| 2002/0120428 A1 * | 8/2002 | Christiaens | 702/186 |

OTHER PUBLICATIONS

U.S. Appl. No. 60/278,060, filed Mar. 22, 2001.
U.S. Appl. No. 60/281,759, filed Apr. 5, 2001.
O. Agesen and A. Garthwaite, "Efficient Object Sampling Via Weak References," pp. 121–126.
T. Harris, "Dynamic Adaptive Pre–Tenuring," pp. 127–136, ISMM '00 Minneapolis, MN., copyright ACM 2000.

(Continued)

*Primary Examiner*—Diane D. Mizrahi
(74) *Attorney, Agent, or Firm*—Casey P. August; Jose Gutman; Fleit, Kain, Gibbons, Gutman, Bongini & Bianco P.L.

(57) ABSTRACT

A computing apparatus and method classify data objects into at least a first type and alternatively a second type, and allocate a first portion of computer memory to objects of the first type and a second portion of computer memory to objects of the second type. Then the method performs garbage collection of data objects within at least one portion of computer memory while retaining surviving objects within the computer memory. Objects of the first type occur in a computer memory with a frequency that exceeds a selected threshold, and are designated "prolific." Objects of the second type occur in the computer memory with a frequency that does not exceed the selected threshold, and are designated "non-prolific".

36 Claims, 7 Drawing Sheets

OTHER PUBLICATIONS

R. Jones and R. Lins, "Garbage Collection—Algorithms for Automatic Dynamic Memory Management," "Generational Garbage Collection," pp. 143–181, John Wiley & Sons, 1996.

A.L. Hosking, J.E.B. Moss, and D. Stefanovic, "A Comparative Performance Evaluation of Write Barrier Implementations," pp. 1–18, Proceedings ACM Conference on Object–Oriented Programming Systems, Languages, and Applications; Vancouver, Canada, Oct. 1992, pp. 92–109.

H. Lieberman and C. Hewitt, "A Real–Time Garbage Collector Based on the Lifetimes of Objects," Communications of the ACM, pp. 419–429, vol. 26, No. 6, 1983.

M.L. Seidl and B.G. Zorn, "Segregating Heap Objects by Reference Behavior and Lifetime," ASPLOS VIII Oct. 1998, pp. 12–23.

Y. Shuf, M. Gupta, R. Bordawekar and J.P. Singh, "Exploiting Prolific Types for Memory Management and Optimizations," POPL 2002, Jan. 16–18, 2002, Portland, OR.

Y. Shuf, M. Gupta, and R. Bordawekar, "Distinguishing Between Prolific and Non–Prolific Types for Efficient Memory Management," pp. 1–13.

D. Stefanovic, K.S. McKinley, and J.E.B. Moss, "Age–Based Garbage Collection," pp. 1–12, OOPSLA'99, Denver, Nov. 1999.

D. Stefanovic, K.S. McKinley, and J.E.B. Moss, "On Models for Object Lifetime Distributions," pp. 137–142, ISMM '00, Minneapolos, MN, copyright ACM 2000.

D. Tarditi, and A. Diwan, "The Full Cost of a Generational Copying Garbage Collection Implementation," pp. 1–8, Sep. 10, 1993.

P.R. Wilson, "Uniprocessor Garbage Collection Techniques," [Submitted to ACM Computing Surveys], pp. 1–67.

P.R. Wilson, M.S. Johnstone, M. Neely, and D. Boles, "Dynamic Storage Allocation: A Survey and Critical Review," pp. 1–78, Sep. 1995.

P.R. Wilson, "Uniprocessor Garbage Collection Techniques," International Workshop on Memory Management, St. Malo, France, Sep. 1992.

S.M. Blackburn, J. Cavazos, S. Singhai, A., Khan, K.S. McKinley, J.E.B. Moss, and S. Smolensky, "Profile–Driven Pretenuring for Java," OOPSLA 2000 Companion, Minneapolis, Minnesota.

* cited by examiner

FIG 7

METHOD FOR EFFICIENT GARBAGE COLLECTION BASED ON OBJECT TYPE

CROSS-REFERENCE TO RELATED APPLICATIONS

This application is based upon and claims priority from prior U.S. Provisional Patent Application No. 60/278,060, filed on Mar. 22, 2001, and further is based upon and claims priority from prior U.S. Provisional Patent Application No. 60/281,759, filed on Apr. 5, 2001, collectively the entire disclosure of which is herein incorporated by reference.

The present patent application is related to co-pending and commonly owned U.S. patent application Ser. No. 10/094,091, entitled "Method for Reducing Write Barrier Overhead", filed on even date with the present patent application, the entire teachings of which being hereby incorporated by reference.

BACKGROUND OF THE INVENTION

1. Field of the Invention

This invention generally relates to the field of automatic memory management, and more particularly relates to a system and method for efficient garbage collection based on object types.

2. Description of Related Art

The popularity of object-oriented programming languages, such as the Java Programming Language, has rekindled a great deal of interest in automatic memory management. Java does not provide the programmer with an explicit mechanism to deallocate objects, and requires the underlying Java Virtual Machines (JVM) to support garbage collection. Researchers have developed a large number of garbage collection algorithms over the last four decades.

One of the popular approaches to garbage collection is known as generational garbage collection. It is inspired by an observation, known as the weak generational hypothesis, that most objects die young. A simple generational scheme involves partitioning the heap space into two regions—a nursery (or new generation) and an old generation. All new objects are allocated in the nursery. Most collections, termed minor collections, only reclaim garbage from the nursery. Survivors from a minor collection are promoted to the older generation, which is subjected to collection only during infrequent, major collections. In order to support a generational collection, the compiler has to insert a write barrier for each statement that writes into a pointer field of an object, to keep track of all pointers from objects in the old generation to objects in the nursery. These source objects in the old generation are added, as roots for minor collection, so that objects in the nursery that are reachable from those objects are not mistakenly collected. Compared with their non-generational counterparts, generational collectors typically have short pauses, due to the need to look at a smaller heap partition at a time, but lead to lower throughput of applications due to the overhead of executing write barriers.

Problems of the generational garbage collection scheme include:

- Sub-optimal throughput of applications due to the overhead of executing write barriers.
- The overhead of processing write buffer entries (created as a result of executing write barriers).
- The overhead of examining reference fields in objects (to ensure that all references pointing into the region of the heap being collected are found).
- The problems associated with premature promotion of young objects that are going to die soon anyway, such as executing more write barriers, dragging dead objects into the old generation, and requiring more major collections.
- The overhead of promoting and scanning long-lived objects.

Therefore a need exists to overcome the problems with the prior art as discussed above, and particularly for a method of efficient garbage collection based on object types.

SUMMARY OF THE INVENTION

A computing apparatus and method classify data objects into at least a first type and alternatively a second type, and allocate a first portion of computer memory to objects of the first type and a second portion of computer memory to objects of the second type. Then the method performs garbage collection of data objects within at least one portion of computer memory while retaining surviving objects within the computer memory. Objects of the first type occur in a computer memory with a frequency that exceeds a selected threshold, and are designated "prolific". Objects of the second type occur in the computer memory with a frequency that does not exceed the selected threshold, and are designated "non-prolific".

DESCRIPTION OF THE PREFERRED EMBODIMENTS

The present invention, according to a preferred embodiment, overcomes problems with the prior art by implementing a new approach to garbage collection based on the notion of prolific and non-prolific object types. Relatively few object types, referred to as prolific types, usually account for a large percentage of objects (and heap space) cumulatively allocated by the program. The objects of prolific types have short lifetimes, and therefore, account for a large percentage of garbage that is collectible at various points during program execution. The present invention, according to a preferred embodiment, presents a new approach to garbage collection that relies on finding garbage primarily among prolific objects. The present invention improves upon generational garbage collection by distinguishing between groups of objects based on type rather than age.

In a preferred embodiment of a type-based garbage collector, all objects of a prolific type are assigned at allocation time to a prolific space (P-space). All minor collections are performed on the P-space. All objects of a non-prolific type are allocated to a non-prolific space (NP-space). Unlike generational collection, objects are not "promoted" from the P-space to the NP-space after a minor collection. This approach leads to several benefits over generational collection:

- It allows a compiler to identify and eliminate unnecessary write barriers using simple type checks. This leads to performance benefits like:
  - reduction in the direct overhead of executing write barriers; and
  - for some write barrier implementations, a reduction in the number of roots that are considered during minor collections, leading to fewer objects being scanned and potentially fewer collections.
- It reduces the number of reference fields examined during garbage collection by using static type information to infer the direction of pointers.
- It avoids the problems associated with premature promotion of young objects that are going to die soon anyway, such as executing more write barriers, dragging dead objects into the old generation, and requiring more major collections.
- In a copying collector, the overhead of copying objects of non-prolific types across generations is avoided.

Figure 3:
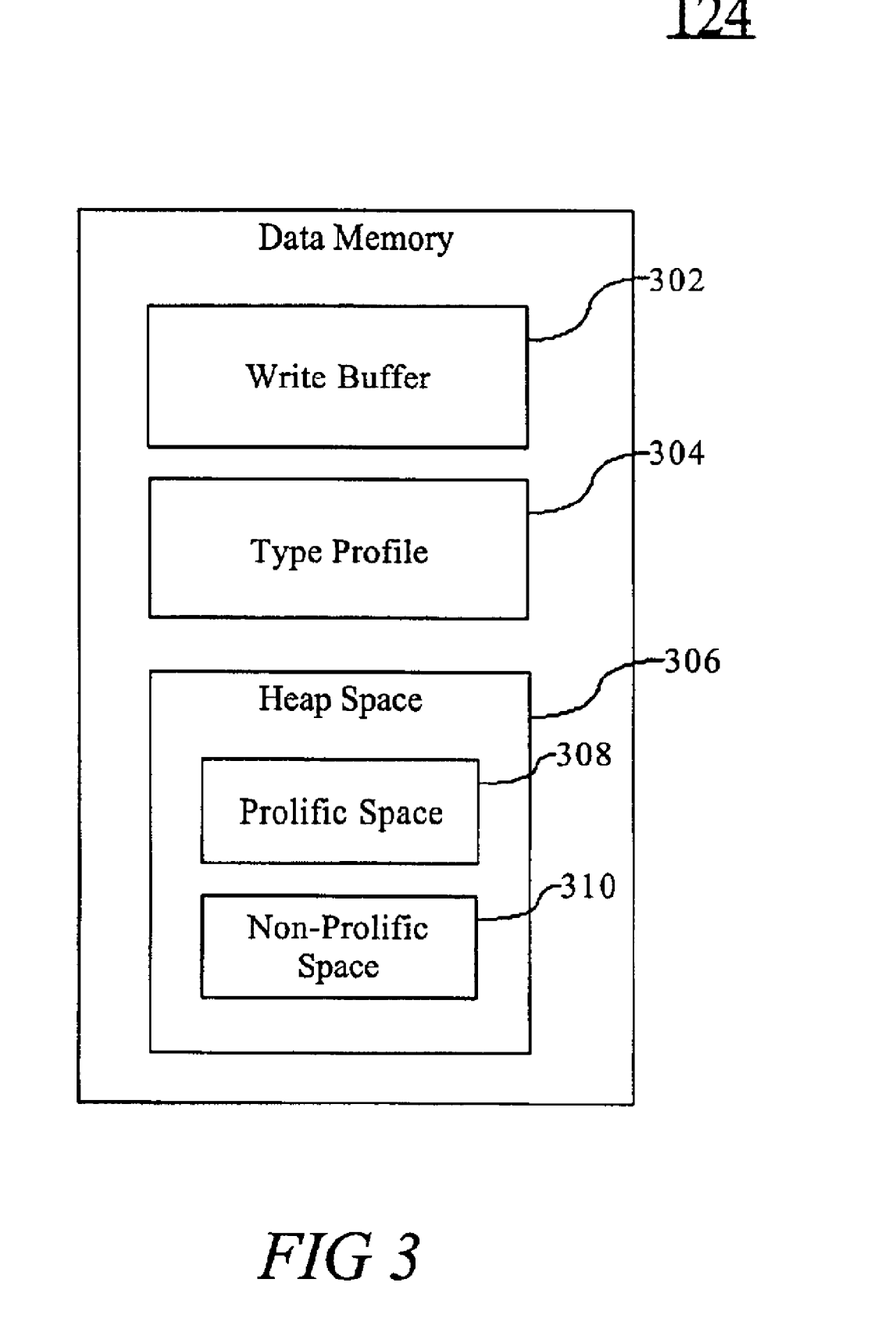
FIG. 3 is a more detailed block diagram of a data memory in the system of FIG. 1, according to a preferred embodiment of the present invention.

The term "prolific type" is used to refer to a type that has a sufficiently large number of instances. More specifically, a type may be prolific with respect to a program if, for example, the fraction of objects of this type exceeds a certain threshold. Preferably, the threshold is simply set to 1% of the total number of objects created by an application. This threshold can be adjusted to control the size of the P-space 308. All remaining types are referred to as non-prolific. Alternatively, prolific types may also be defined as some "k" popular types with respect to the total number of instances.

The objects of prolific types are expected to have small lifetimes. The present invention is based on the expectation that the objects of prolific types die younger than objects of non-prolific types. It follows that most of the garbage collectible at various stages of the application would consist of objects of prolific types. Accordingly, a preferred embodiment of the present invention is a different way of collecting garbage, which looks for garbage first among objects of prolific types.

Figure 1:
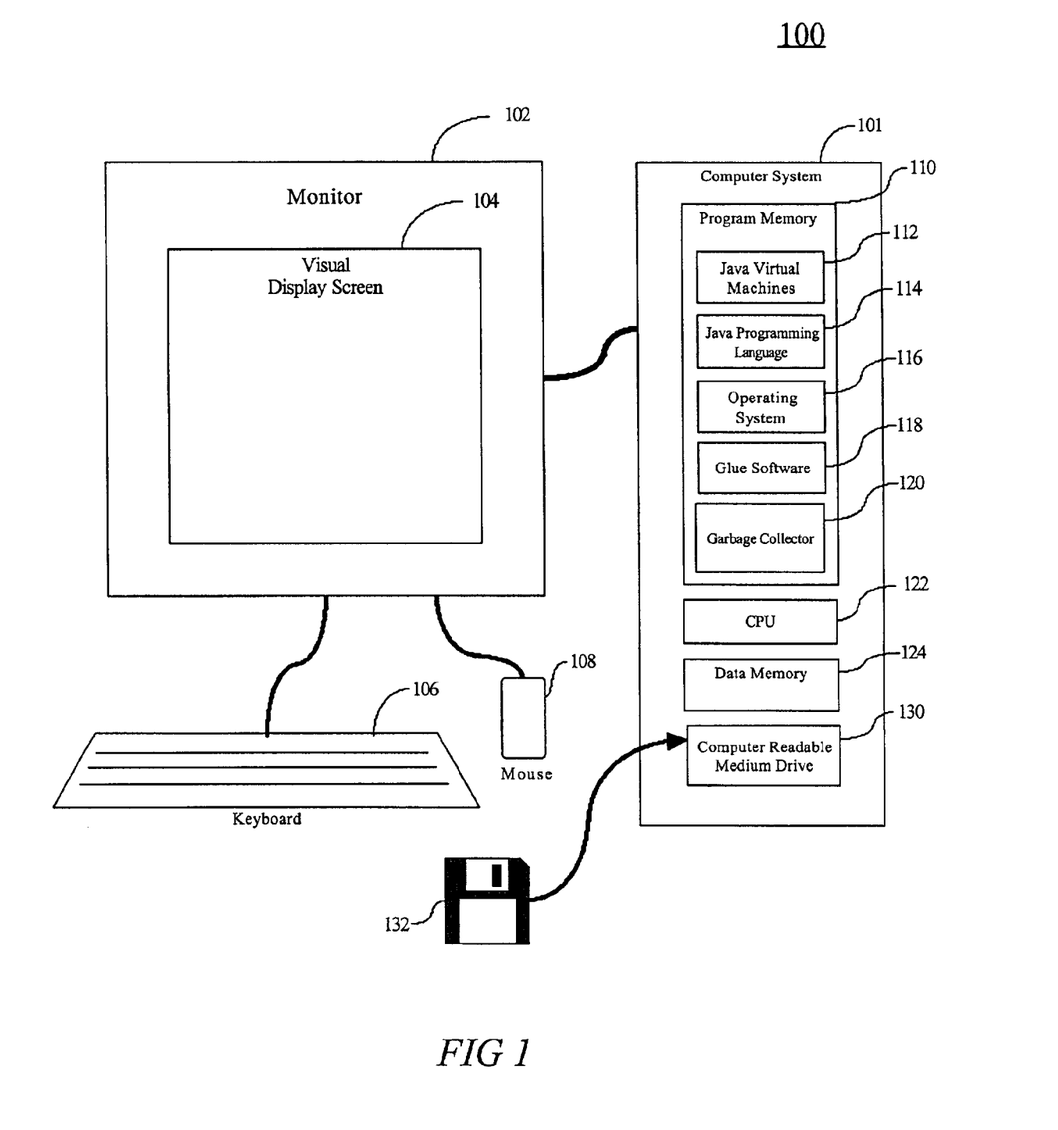
FIG. 1 is a block diagram illustrating a computer system in accordance with a preferred embodiment of the present invention.
Figure 2:
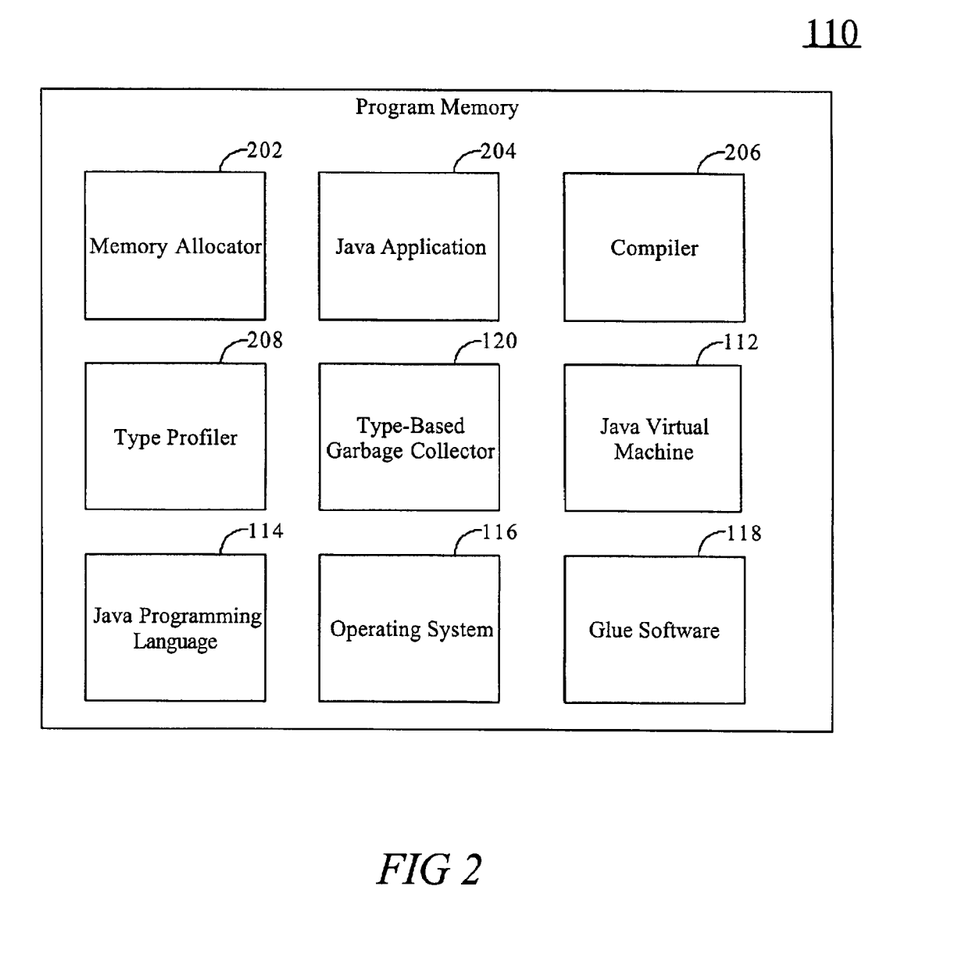
FIG. 2 is a more detailed block diagram showing a garbage collecting application in the system of FIG. 1, according to a preferred embodiment of the present invention.

FIGS. 1 and 2 illustrate an exemplary garbage collection system according to a preferred embodiment of the present invention. The garbage collection system 100 includes a computer system 101, having a garbage collector 120. The computer system 101, according to the present example, includes a controller/processor 122, which processes instructions, performs calculations, and manages the flow of information through the computer system 101. Additionally, the controller/processor 122 is communicatively coupled with program memory 110. Included within program memory 110 are a garbage collector 120 (which will be discussed in later in greater detail), operating system platform 116, Java Programming Language 114, Java Virtual Machine 112, glue software 118, Java application 204, a memory allocator 202, a compiler 206, and a type profiler 208. It should be noted that while the present invention is demonstrated using the Java Programming Language, it would be obvious to those of ordinary skill in the art, in view of the present discussion, that alternative embodiments of the invention are not limited to a particular computer programming language. The operating system platform 116 manages resources, such as the data stored in data memory 124, the scheduling of tasks, and processes the operation of the garbage collector 120 in the program memory 110. The operating system platform 116 also manages a graphical display interface (not shown), a user input interface (not shown) that receives inputs from the keyboard 106 and the mouse 108, and communication network interfaces (not shown) for communicating with a network link (not shown). Additionally, the operating system platform 116 also manages many other basic tasks of the computer system 101 in a manner well known to those of ordinary skill in the art.

Glue software 118 may include drivers, stacks, and low level application programming interfaces (API's) and provides basic functional components for use by the operating system platform 116 and by compatible applications that run on the operating system platform 116 for managing communications with resources and processes in the computing system 101.

Each computer system 101 may include, inter alia, one or more computers and at least a computer readable medium 132. The computers preferably include means for reading and/or writing to the computer readable medium 132. The computer readable medium 132 allows a computer system 101 to read data, instructions, messages or message packets, and other computer readable information from the computer readable medium. The computer readable medium, for example, may include non-volatile memory, such as Floppy, ROM, Flash memory, disk drive memory, CD-ROM, and other permanent storage. It is useful, for example, for transporting information, such as data and computer instructions, between computer systems.

FIG. 3 illustrates a preferred embodiment of the data memory 124 of the garbage collecting system 100 of FIG. 1. Data memory 124 includes a write buffer 302, a type profile 304 containing information about types of objects, and a heap space 306 preferably divided into a prolific space 308 and a non-prolific space 310. Note, however, that the heap space 306, according to an alternative preferred embodiment, may combine both prolific and non-prolific object space into one combined memory space.

A preferred embodiment of the type-based approach in a Java Virtual Machine (JVM) 112 is now described. The JVM 112 supports a number of different garbage collectors 120, which can be used in different configurations.

Figure 4:
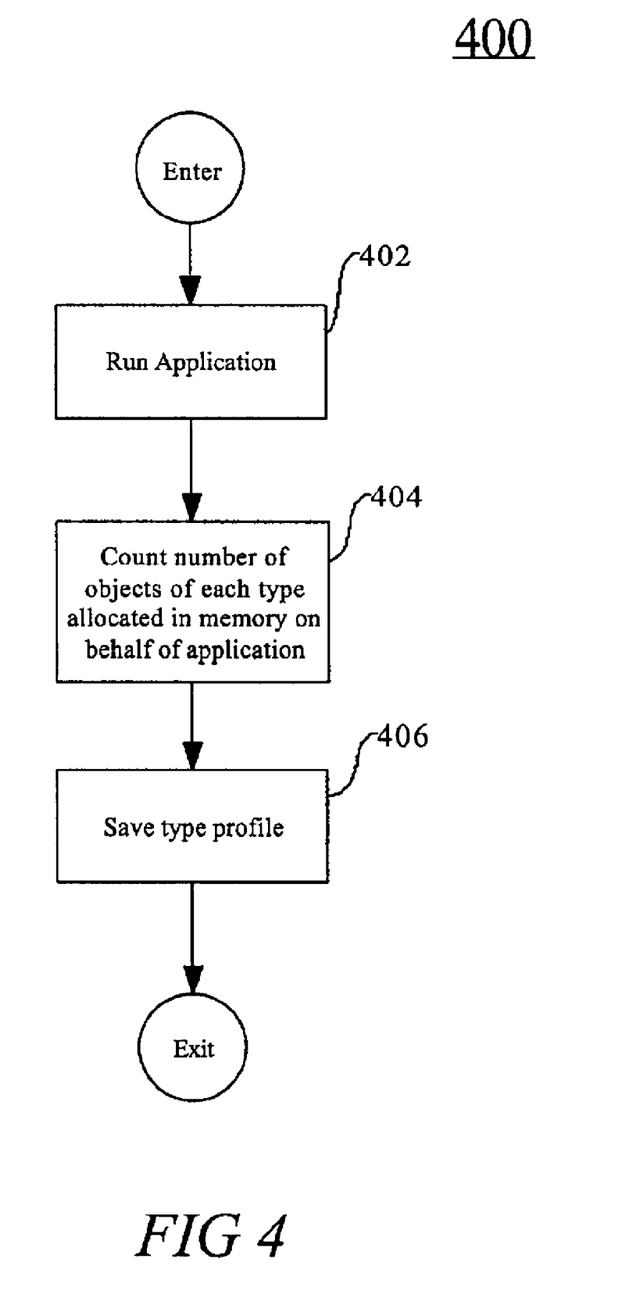
FIGS. 4, 5, and 6 are operational flow diagrams illustrating exemplary operational sequences for the system of FIG. 1, according to a preferred embodiment of the present invention.
Figure 5:
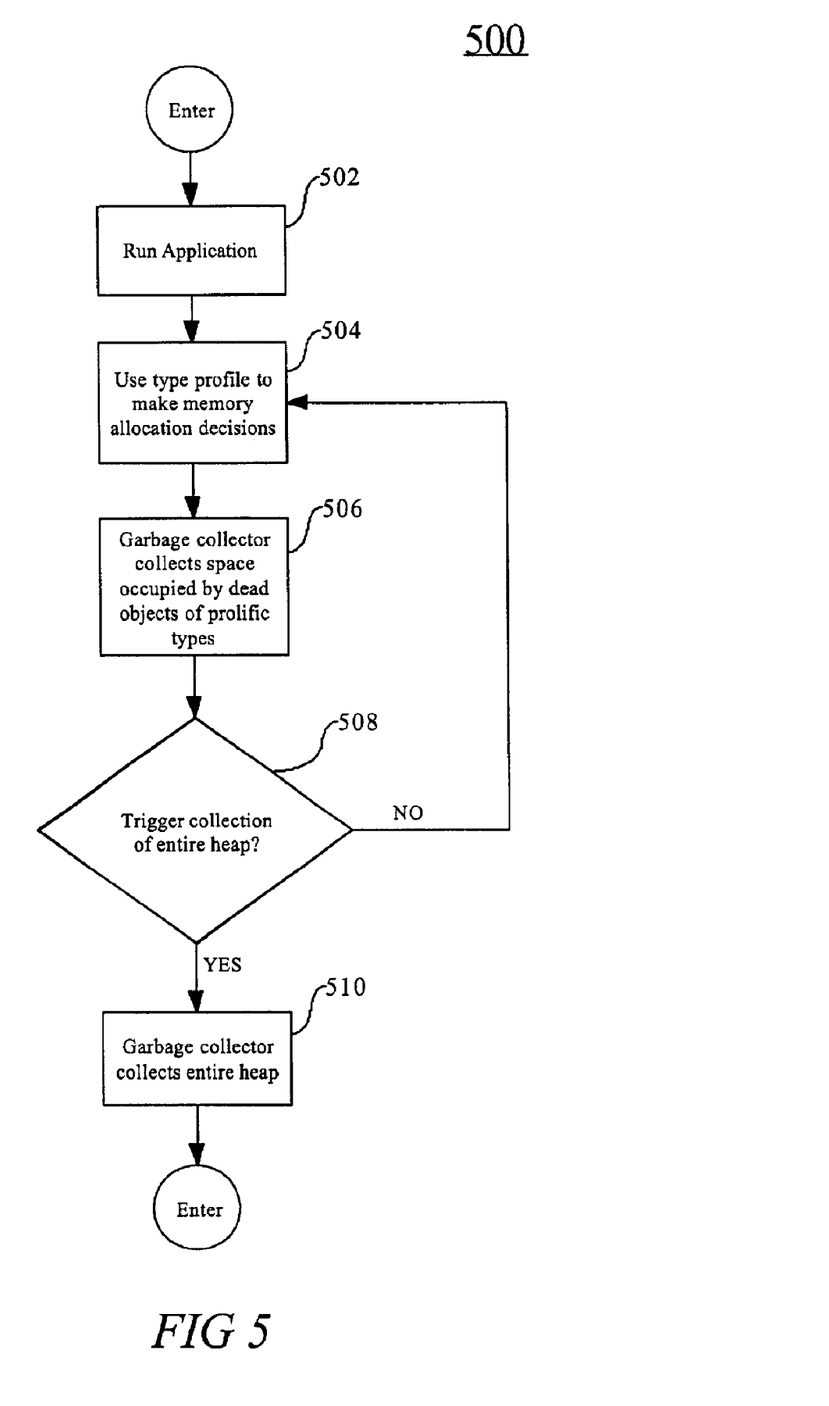

The JVM 112 is enhanced to introduce two modes of execution. In one (profiling) mode, as shown in FIG. 4, the type profile 304 is collected; in the other (production) mode, as shown in FIG. 5, the type profile 304 collected in the profiling run 400 is used by the memory allocator 202 and by the garbage collector 120 to implement type-based heap management, and by the compiler 206 to optimize away redundant write barrier code.

In the profiling mode 400, the type profiler 208 monitors all allocation requests, collects its type profile, and produces a file (type profile 304) with the profile information, including class hierarchy information. In the production mode 500, the memory allocator 202, in step 504, uses the previously collected type profile 304 to make allocation decisions. Also, in the production mode, the garbage collector 120, at step 506, repeatedly collects space occupied by unreachable objects of prolific types. When a triggering event occurs, such as only freeing a small portion of memory, at step 508, it collects the entire heap in step 510.

The simplest method of identifying prolific types is to use offline profiling. In an offline run, a runtime system (type profiler 208) monitors memory allocation requests issued by an application 204, at step 402, and counts the number of objects of each type that are allocated on behalf of an application 204, at step 404. The type profile 304 is saved to a file, at step 406, for later use. When an application (or a JVM 112) exits, the collected type profile 304 is saved into a file. During an actual run, the runtime system uses a previously collected type profile 304 to perform various optimizations. Thus, no monitoring overhead is incurred during the production run of the application 204.

A disadvantage of this approach, as with any offline profiling method, is that it requires a separate profiling run and the type profiles 304 may vary depending on input data supplied to an application 204. In addition, an application 204 may consist of several execution phases with drastically different type profiles 304. A type profile 304 of such an application 204 is going to reflect its "average" behavior during the entire run. Although imperfect, this "one size fits all" approach still works quite well for many applications 204.

An adaptive approach, in contrast to the offline profiling approach, attempts to identify prolific types during the actual production run of the application 204. An obvious adaptive strategy would be to monitor each memory allocation in the application 204. However, this has the disadvantage of relatively high runtime overhead. It should be possible to reduce the overhead of monitoring object allocations by using sampling techniques.

An alternative approach is to monitor the garbage collections rather than memory allocations to identify prolific types. Most unreachable objects are expected to be of prolific types. Although examining unreachable objects could lead to a fairly accurate characterization of types as prolific or non-prolific, it would be an expensive operation. Again, sampling techniques using weak references, or other techniques, could help reduce the overhead, since only a small subset of the unreachable objects would then be examined.

The type-based memory allocator 202 partitions heap space 306 into a prolific space 308 and a non-prolific space 310: P-space and NP-space, respectively. Note that the actual allocation mechanism is related to the kind of collector used by the system. When used with a copying (type-based) collector 120, the memory allocator uses 202 different regions of the memory 124 for the P-space and NP-space. With a non-copying collector, the objects of prolific and non-prolific types are tagged differently, but not necessarily allocated in separate memory regions.

When we discuss prolific and non-prolific spaces, we do not necessarily mean two different regions of memory, e.g., of the heap. With a non-copying collector, for example, prolific and non-prolific objects may reside next to each other in memory. As will be obvious to those of ordinary skill in the art in view of the present discussion, a garbage collection system, according to a preferred embodiment of the present invention, could distinguish between prolific and non-prolific objects, such as by using a single bit in an object header or by looking at an object type and checking that type against a type profile.

Given an allocation request for an object of a certain type, the memory allocator 202 checks the type profile 304 of the application (with information about whether or not the type is prolific) to decide whether to place the object in the P-space 308 or NP-space 310. Hence, compared to a traditional memory allocator, the allocation path of the type-based memory allocator 202 would have an extra step for checking the type of the object. However, since the prolificacy of types is known at compile-time, the compiler 206 can avoid the overhead of the type check by simply calling (and possibly inlining) a specialized version of the allocator for prolific or non-prolific types. An alternative embodiment performs this optimization.

It should be noted that the compiler 206 is typical of many compilers used in object-oriented programming languages in that it may have several modes of operation, including:

Incremental compilation—during which time the compiler may compile only a program code segment, linking and loading any required modules. The program segment may include any portion of the program, up to and including the entire program code.

Recompilation of pre-compiled code—the compiler may recognize that a portion of needed code has been previously compiled and recompiles the code.

Traditional compilation—translates an entire program code.

Mixed-mode compilation—may perform a combination of any of the above modes.

The type-based garbage collector 210 assumes that most objects of prolific types die young, and performs minor collections only on the P-space 308. Because objects of prolific types account for most of heap space 306, a preferred embodiment the invention expects to collect enough garbage on each P-space 308 collection. A full collection of both P-space 308 and NP-space 310 may be induced by a variety of triggering events described in prior art. One such triggering event occurs when a P-space 308 collection does not yield a sufficient amount of free space. Because enough unreachable objects should be uncovered during a P-collection, the full collections are expected to be infrequent. Objects remain in their respective spaces after both P-space 308 and full collections—i.e., unlike generational collection, objects that survive a P-space 308 (minor) collection stay there and are not "promoted" to the NP-space 310. This enables the compiler 206 to eliminate unnecessary write barriers with a relatively simple type check, as described herein below. Given the low survival rates of objects in the P-space 308, the "pollution" of P-space due to longer-lived objects is not expected to be a significant problem.

In order to ensure that during a P-space 308 (minor) collection, any object reachable from an object in the NP-space 310 is not collected, garbage collection in accordance with a preferred embodiment of the invention has to keep track of all such pointers from an object in the NP-space 310 to an object in the P-space 308. This is accomplished by executing a write barrier code for pointer assignments during program execution, which records such references and places them in a write buffer 302. The contents of the write buffer 302 represent roots used in a P-space 308 collection.

The type-based scheme requires a write barrier to be executed only upon creation of a reference from the NP-region to the P-region. Write barriers may be executed in other cases but those executions of write barriers will unnecessarily reduce throughput of an application (i.e., useless overhead which can be optimized away). In other words, a write barrier has to be compiled into a code at a point in a program when said program creates a reference from a source object that is non-prolific to a target objects that is prolific. In the presence of a class hierarchy (e.g., programs written in the Java programming language), a write barrier has to be compiled into a code when a source object may be non-prolific and a target object may be prolific.

A compiler can determine on-the-fly whether a write barrier is necessary for a program point when a reference is created and compile a write barrier into a code. If a compiler determines that a write barrier is not necessary for a program point when a reference is created, a write barrier code is not included. Alternatively, a compiler can first identify each place in a program when a write barrier may be necessary and then eliminate an unnecessary write barrier on-the-fly or in a post-processing step.

Figure 6:
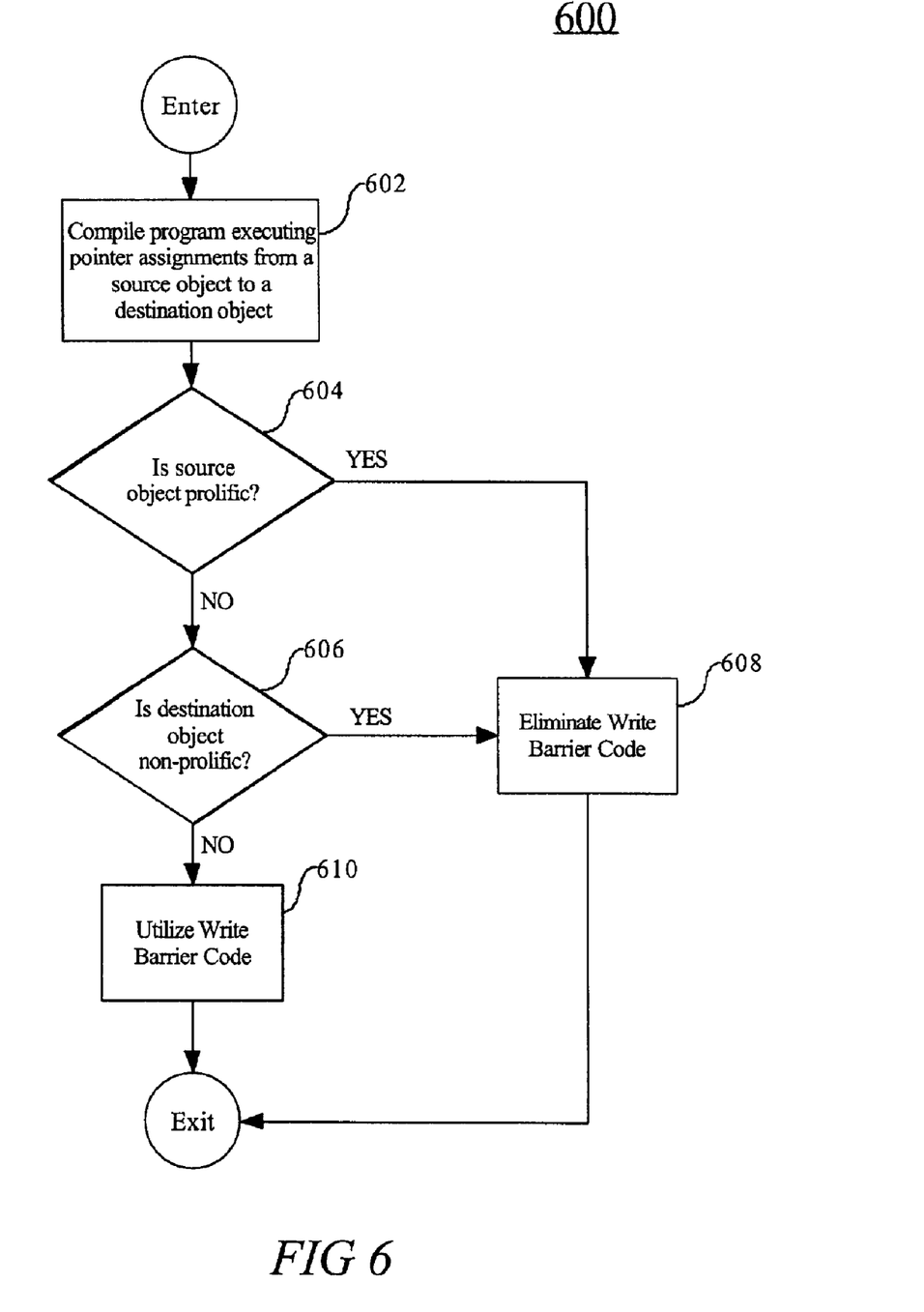

In the type-based collection, objects are not moved from P-space 308 to NP-space 310 or vice versa. Hence, write barriers (which are supposed to keep track of references from NP-space to P-space) can be eliminated at compile time based on a simple type check shown in FIG. 6. More specifically, given an assignment statement where the pointer of an object of type source is assigned a value corresponding to a pointer of an object of type target, the condition for eliminating a write barrier is expressed as code segment 702 in FIG. 7.

Figure 7:
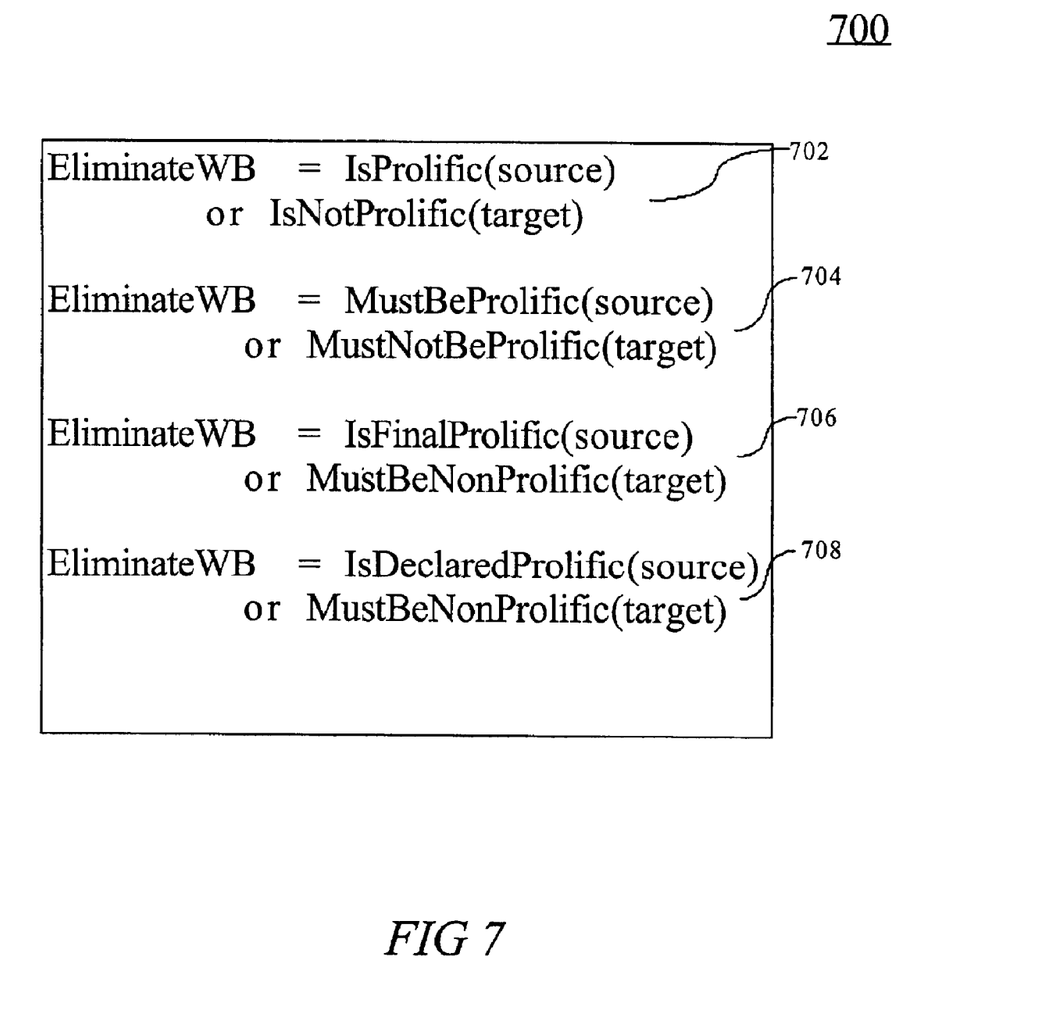
FIG. 7 is a table of exemplary code segments for the system of FIG.1, according to a preferred embodiment of the present invention.

In an object-oriented language with polymorphism, such as Java, a code segment 702 requires analyses like class hierarchy analysis or rapid type analysis, similar to those needed for inlining or devirtualization of methods. This conservativeness is made explicit by redefining code segment 702 to be code segment 704. Given a declared type T of an object o, the compiler 206 checks for MustBeProlifilc(o) by checking that all children of T in the class hierarchy are prolific, and can similarly check for MustBeNonProlific(o).

Dynamic class loading is another feature of languages like Java that forces compile-time analysis to be done more conservatively. Again, the problem is similar to the problem with inlining of virtual methods in the presence of dynamic class loading. Due to dynamic class loading, a program can load a new class that is non-prolific but subclasses a prolific class, unless the prolific class is declared final. Note that with a type prolificacy based methodology, a newly loaded class (which the compiler does not know about) would not be classified as prolific, since no instance of that class would have been seen. Therefore, while the check MustBeNonProlific(target) in code segment 704 could be done by looking at the existing type hierarchy, the check MustBeProlific(source) would be conservatively set to IsFinalProlific(source), so that the code continues to work correctly after new classes are loaded. In this case, the condition under which a write barrier may be eliminated becomes code segment 706.

It is possible to use the techniques for inlining virtual methods in the presence of dynamic class loading, like preexistence analysis and extant analysis, to improve the effectiveness of code segment 706. For example, using extant analysis, if a specialized method in which the source reference is known to be extant (i.e., pointing to an existing object) is created, the test MustBeProlific(source) can be performed based on the existing class hierarchy, without worrying about any new classes that might be loaded. A much simpler technique, described below, is used in the preferred embodiment.

The prolific types are likely to be leaves, or close to leaves, in a type hierarchy. The intermediate classes are typically used for defining a functionality that is common to all of their children classes. The subclasses then refine the behavior of their parent classes and are usually instantiated more frequently than their respective parent classes. While it is possible that a prolific class may have one or more subclasses that are not prolific, all children of prolific types are treated as prolific. This greatly simplifies the test to check if a type is definitely prolific. The test returns true if the declared type of the variable is prolific, and returns false otherwise (without looking any further at the class hierarchy). In particular, code segment 708 for eliminating redundant write barriers can be done without worrying about any new classes that may be dynamically loaded in the future (because any dynamically loaded class that subclasses a prolific type are regarded as prolific).

There are various extensions to the basic scheme, which can improve the performance of the system. One of the fields in an object header usually points to a special object describing its type (or class) information. For example, in the Java Virtual Machine 112 of the present invention, this field points to a type information block (TIB) and is called a TIB field. Scanning TIB pointers for every reachable object does not seem to be necessary and can be avoided in the type-based scheme. It is sufficient for only one object of a type to survive a collection to ensure that the TIB of that object is scanned and marked as live. The scanning of TIB fields of all other instances of that type are unnecessary, although the garbage collector will realize after reaching the TIB object that it has already been marked. Since the number of distinct types is small, the number of objects representing them is also small. It follows that such objects can be classified as instances of a non-prolific type and placed in the NP space 310. As a result, the TIB fields (which now point to the NP-space 310) do not have to be scanned during a P-space 308 collection.

The idea of not scanning TIB objects during a P-space 308 collection can be taken further by observing that only objects of prolific types need to be scanned in the P-space 308 collection. In the type-based scheme of the invention, the number of pointers processed can be reduced even further during a P-space 308 collection.

During the P-space 308 scanning process, for each object, the garbage collector 120 requests the list of fields that are references. This list is created when a class is loaded. Normally, the returned list contains all such reference fields. Consequently, all such references are first processed and then some of them (e.g., those pointing to young objects) are scanned. However, in the type-based collector 120, there is no need to return a complete list of reference fields to the collector 120 during a P-space 308 collection. Only the references pointing to objects of prolific types have to be returned (because objects residing in the NP-space 310 are only scanned during a full collection). To support this extension, the collector is provided with two different sets of methods returning the lists of reference fields: one (returning a partial list) for a P-space 308 collection and one (returning a full list) for a full collection.

By defining several degrees of prolificacy of types, several P-spaces 308 can be created. Objects corresponding to different levels of prolificacy will have different lifetimes. Each such space may be collected with a different frequency. This is different from generational garbage collectors employing multiple generations and promoting objects with different ages to different generations.

It would be useful to have a separate sub-space within the NP-space 310 for objects of non-prolific types that cannot point to objects in the P-space 308 directly. By partitioning the NP-space 310 in this manner, the need to maintain card marking data structures for this sub-space can be eliminated because a write barrier cannot be executed on any object in this sub-space.

Combining type-based memory management with lifetime analysis of objects may lead to further performance improvements. Although, most short-lived objects are instances of prolific types, there may be some non-prolific types whose instances are always short lived. It may be advantageous to collocate such objects of non-prolific types with objects of prolific types in the P-space 308 (and to treat them as if they were instances of prolific types) thereby reducing the pollution of NP-space 310, albeit only slightly. However, if such short-lived objects can point directly to a P-space 308, then this collocation can also reduce the pollution of P-space 308 after a P-space 308 collection.

The type-based approach is therefore different from the generational approach in a number of ways:

It involves pre-tenuring objects of non-prolific types into the heap partition, which is collected less often. These objects do not need to be scanned during P-region (minor) collections. Those savings may be limited because instances of non-prolific types, by their very nature, would not have occupied a lot of space in the nursery.

Objects of prolific types are never promoted to the heap partition, which is collected less often. This can be a double-edged sword. If objects of prolific types live for a long time, they can pollute the P-region, causing the scanning time to increase during future minor collections (fortunately, it does not happen in practice). However, this approach can also help avoid the negative side effects of premature promotion of young objects which are going to die soon anyway (namely, executing more write barriers; dragging more objects via write buffers into the old generation; and requiring more major collections).

The separation between the heap partitions is based on static characteristics, i.e. the types of objects, rather than dynamic characteristics such as their ages. This allows unnecessary write barriers to be eliminated with a simple (and well-known in the context of dealing with virtual methods) compile-time analysis. This, apart from saving the direct overhead of executing write barriers, can also help avoid adding unnecessary objects to the write buffer, thus leading to fewer roots for minor collections, and potentially, more effective garbage collection.

During a P-region collection, only objects of prolific types have to be scanned. As a result, reference fields that can only point to objects of non-prolific types do not even need to be examined. Fewer pointers to be examined translates into shorter garbage collection pauses. This optimization is also a consequence of the type-based nature of the division. It is possible because in our scheme, the assignment of an object to a separate region of collection depends only on the prolificacy of its type. This optimization cannot be performed in a generational scheme in which a reference field can point to either the nursery or the mature space; because the direction of a pointer cannot be known without actually examining it, all reference fields have to be checked for pointers into the nursery.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of memory management comprising the steps of:
   classifying data objects into at least a first type and alternatively a second type; and
   allocating a first portion of computer memory to data objects of the first type and a second portion of computer memory to data objects of the second type, wherein the first and second portions of computer memory for performing garbage collection thereon respectively.

2. The method of claim 1, further comprising:
   carrying out garbage collection of data objects within at least one portion of computer memory while retaining all surviving objects within the at least one portion of computer memory.

3. A method of memory management comprising the steps of:
   classifying data objects into at least a first type and alternatively a second type; allocating a first, portion of computer memory to data objects of the first type and a second portion of computer memory to data objects of the second type; and
   carrying out garbage collection of data objects within at least one portion of computer memory while retaining all surviving objects within the at least one portion of computer memory, wherein objects of the first type occur in a computer memory with a frequency that exceeds a selected threshold, the first type being designated "prolific", and wherein objects of the second type occur in the computer memory with a frequency that does not exceed the selected threshold, the second type being designated "non-prolific".

4. A method comprising the steps of:
   using a type profile to assign objects of a prolific type to a prolific space in memory and objects of a non-prolific type to a non-prolific space in memory;
   collecting space occupied by unreachable objects of prolific types in the prolific memory space when a first triggering event occurs; and
   collecting space occupied by unreachable objects in the memory when a second triggering event occurs.

5. The method of claim 4, wherein the first triggering event comprises a determination that an amount of free memory is less than a predetermined threshold.

6. The method of claim 4, wherein the second triggering event comprises a determination that an amount of free memory is less than a predetermined threshold.

7. The method of claim 4, further comprising the steps of:

creating the type profile by;

running a computer application;

counting objects allocated in memory, calling popular types "prolific" and non-popular types "non-prolific"; and saving a type profile of the prolific and non-prolific types.

8. The method of claim 4, wherein the prolific types comprises a type in which a total amount of instances of the type exceeds a predetermined threshold with respect to a total number of objects created by the application.

9. The method of claim 4, wherein the prolific types comprises a top "k" popular types with respect to the total number of instances.

10. The method of claim 4, further comprising the steps of:

monitoring memory allocations while an application is running; and updating the type profile to reflect any changes in the memory allocations.

11. The method of claim 4, wherein the type profile is created by running a computer application;

collecting space occupied by unreachable objects in the memory space;

calling popular types "prolific" and non-popular types "non-prolific"; and saving a type profile of the profile and non-prolific types.

12. The method of claim 4, wherein the collecting space occupied by unreachable objects of prolific types in the prolific memory space step further comprises eliminating scanning type information blocks.

13. The method of claim 4, further comprising providing a list of references pointing to objects of prolific types.

14. The method of claim 4, wherein the prolific memory space is further divided into at least two sub-spaces according to increasing degrees of prolificacy of types.

15. The method of claim 4, wherein the non-prolific memory space is further divided to comprise a sub-space for objects of non-prolific types that cannot point to objects in the prolific space.

16. A data memory for storing a heap space divided into a prolific space and a non-prolific space comprising:

a program memory for storing a computer application;

a memory allocator for assigning objects in memory to the prolific space or the non-prolific space, communicatively coupled to the program memory and to the data memory; and a type-based garbage collector, communicatively coupled to the program memory and to the data memory, for collecting space occupied by unreachable objects of prolific types in the prolific memory space when a first triggering event occurs, and collecting space occupied by unreachable objects in the entire memory when a second triggering event occurs.

17. The apparatus of claim 16, wherein the first triggering event comprises a determination that an amount of free memory is less than a predetermined threshold.

18. The apparatus of claim 16, wherein the second triggering event comprises a determination that an amount of free memory is less than a predetermined threshold.

19. The apparatus of claim 16, wherein the data memory further comprises a typo profile.

20. The apparatus of claim 16, wherein the prolific space is further divided into at least two sub-spaces according to increasing degrees of prolificacy of types.

21. The apparatus of claim 16, wherein the non-prolific space is further divided to comprise a sub-space for objects of non-prolific types that cannot point to objects in the prolific space.

22. A computer readable medium, comprising computer instructions for:

classifying data objects into at least a first type and alternatively a second type; and allocating a first portion of computer memory to objects of the first type and a second portion of computer memory to objects of the second type, wherein the first and second portions of computer memory for performing garbage collection thereon respectively.

23. The computer readable medium of claim 22, further comprising:

carrying out garbage collection of data objects within at least one portion of computer memory while retaining surviving objects within the at least one portion of computer memory.

24. A computer readable medium, comprising computer instructions for:

classifying data objects into at least a first type and alternatively a second type;

allocating a first portion of computer memory to objects of the first type and a second portion of computer memory to objects of the second type; and carrying out garbage collection of data objects within at least one portion of computer memory while retaining all surviving objects within the at least one portion of computer memory wherein objects of the first type are stored in a computer memory at a frequency that exceeds a selected threshold, the first type being designated "prolific", and wherein objects of the second type are stored in the computer memory at a frequency that does not exceed the selected threshold, the second type being designated "non-prolific".

25. A computer readable medium comprising instructions for performing the steps of:

using a type profile to assign objects of a prolific type to a prolific space in memory and objects of a non-prolific type to a non-prolific space in memory;

collecting space occupied by unreachable objects of prolific types in the prolific memory space when a first triggering event occurs; and collecting space occupied by unreachable objects in the memory when a second triggering event occurs.

26. The computer readable medium of claim 25, wherein the first triggering event comprises a determination that an amount of free memory is less than a predetermined threshold.

27. The computer readable medium of claim 25, wherein the second triggering event comprises a determination that an amount of free memory is less than a predetermined threshold.

28. The computer readable medium of claim 25, further comprising instructions for:

creating the type profile by;

running a computer application;

counting objects allocated in memory;

calling popular types "prolific" and non-popular types "non-prolific"; and saving a type profile of the prolific and non-prolific types.

29. The computer readable medium of claim 25, wherein the prolific types comprises a type in which a total amount of instances of the type exceeds a predetermined threshold with respect to a total number of objects created by the application.

30. The computer readable medium of claim 25, wherein the prolific types comprises a top "k" popular types with respect to the total number of instances.

31. The computer readable medium of claim 25, further comprising instructions for:

monitoring memory allocations while an application is running; and updating the type profile to reflect any changes in the memory allocations.

32. The computer readable medium of claim 25, wherein the type profile is created by:

running a computer application;

collecting space occupied by unreachable objects in the memory space;

calling popular types "prolific" and non-popular types "non-prolific"; and saving a type profile of the prolific and non-prolific types.

33. The computer readable medium of claim 25, wherein the collecting space occupied by unreachable objects of prolific types in the prolific memory space step further comprises eliminating scanning type information blocks.

34. The computer readable medium of claim 25, further comprising instructions for:

providing a list of references pointing to objects of prolific types.

35. The computer readable medium of claim 25, wherein the prolific memory space is further divided into at least two sub-spaces according to increasing degrees of prolificacy of types.

36. The computer readable medium of claim 25, wherein the non-prolific memory space is further divided to comprise a sub-space for objects of non-prolific types that cannot point to objects in the prolific space.

* * * * *